US006588205B1

(12) United States Patent
Kumagai et al.

(10) Patent No.: US 6,588,205 B1
(45) Date of Patent: Jul. 8, 2003

(54) EXHAUST GAS PURIFYING APPARATUS

(75) Inventors: Shiro Kumagai, Kyoto (JP); Kazuo Koga, Okazaki (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 09/076,415

(22) Filed: May 12, 1998

(30) Foreign Application Priority Data

May 14, 1997 (JP) .............................................. 9-124492

(51) Int. Cl.[7] .................................................. F01N 3/00
(52) U.S. Cl. .............................. 60/298; 60/285; 60/284; 60/295; 422/177; 422/171; 423/244.07; 423/244.06
(58) Field of Search .......................... 60/285, 286, 297, 60/295, 284; 123/406.44; 422/177, 171, 168, 170; 423/244.01, 244.06

(56) References Cited

U.S. PATENT DOCUMENTS

| | | | | |
|---|---|---|---|---|
| 4,088,606 A | * | 5/1978 | Fedor et al. ................ | 252/465 |
| 5,362,463 A | | 11/1994 | Stiles et al. | |
| 5,396,764 A | * | 3/1995 | Rao et al. ...................... | 60/274 |
| 5,448,887 A | * | 9/1995 | Takeshima et al. ........... | 60/278 |
| 5,473,890 A | * | 12/1995 | Takeshima et al. ........... | 60/285 |
| 5,656,244 A | * | 8/1997 | Cole .......................... | 422/171 |
| 5,698,776 A | * | 12/1997 | Tomisawa .................... | 73/115 |
| 5,758,493 A | * | 6/1998 | Asik et al. .................... | 60/274 |
| 5,849,660 A | | 12/1998 | Takemoto et al. | |
| 5,894,725 A | * | 4/1999 | Cullen et al. ................. | 60/274 |
| 5,974,793 A | * | 11/1999 | Kinugasa et al. ............. | 60/285 |

FOREIGN PATENT DOCUMENTS

| | | |
|---|---|---|
| EP | 0589393 A2 | 3/1994 |
| EP | 0580389 A | 11/1994 |
| EP | 0627548 A1 | 12/1994 |
| EP | 08100638 | 4/1996 |
| EP | 0761286 A2 | 3/1997 |
| WO | WO89/03720 | 5/1989 |

* cited by examiner

*Primary Examiner*—Thomas Denion
*Assistant Examiner*—Binh Tran
(74) *Attorney, Agent, or Firm*—Rossi & Associates

(57) ABSTRACT

An exhaust gas purifying apparatus is provided which includes a three way catalyst provided in an exhaust pipe of an internal combustion engine; and a NOx adsorption/reduction catalyst provided in the exhaust pipe to be located downstream of the three way catalyst. Nickel serving as a catalyst source is loaded on an alumina support layer of the NOx adsorption/reduction catalyst. When the engine operates with a fuel-rich air/fuel mixture at a relatively small air-fuel ratio, a reducing atmosphere is formed around the NOx catalyst, and the reaction to convert NiO into NiS occurs, thereby to consume $H_2S$. As a result, consumption of $SO_2$ proceeds, and the reaction to convert $BaSO_4$ as an oxidized product of sulfur deposited on the NOx catalyst into $BaCO_3$ as an NOx adsorbent is accelerated in an oxidizing atmosphere, thereby resuming the purifying capability of the NOx catalyst.

10 Claims, 5 Drawing Sheets

EXHAUST GAS PURIFYING APPARATUS

FIELD OF THE INVENTION

The present invention relates to an exhaust gas purifying apparatus, and in particular to such an exhaust gas purifying apparatus which includes a NOx adsorption/reduction catalyst that is able to resume its purifying capability in a short time, and which may be suitably used in an internal combustion engine of lean-burn combustion type or in-cylinder injection type.

BACKGROUND OF THE INVENTION

One type of exhaust gas purifying device is known which includes a three way catalyst that provides an excellent purifying effect while the internal combustion engine is operating in a region around the stoichiometric ratio, and a lean-burn NOx catalyst that serves to remove NOx (nitrogen oxides) while the engine is operating in a lean-burn region. In this type of exhaust gas purifying device, the three way catalyst is located on the upstream side within an exhaust pipe of the engine, so that this catalyst can be rapidly activated so as to provide improved exhaust gas characteristics, in particular, immediately after the start of the engine. With the purifying device thus constructed, hydrocarbons and carbon monoxide contained in exhaust gases are consumed through exhaust gas purification of the three way catalyst, and therefore the concentrations of hydrocarbons and carbon monoxide have been reduced by the time when the exhaust gases reach the NOx catalyst located downstream of the three way catalyst. In this type of exhaust gas purifying device in which the NOx catalyst is located downstream of the three way catalyst, therefore, a NOx adsorption/reduction catalyst is generally used as the NOx catalyst, since little choice is left for using a NOx selective-reduction catalyst for removing NOx by reacting NOx with hydrocarbon, or the like. This NOx adsorption/reduction catalyst has a NOx adsorbent that adsorbs NOx in exhaust gases in the form of its oxidized product in an oxidizing atmosphere, and is adapted to reduce the oxidized product of NOx adsorbed on the NOx adsorbent in a reducing atmosphere, so that the NOx is dissolved or converted into a harmless nitrogen gas, while regenerating the NOx adsorbent. Even where this type of NOx catalyst is used, however, NOx is discharged into the atmosphere without being adsorbed onto the catalyst if the amount of NOx adsorbed on the catalyst reaches its saturation level.

In view of the above problem, it has been proposed in WO 93/07363 to switch the operating region of the internal combustion engine from a lean-burn region to a rich-burn region before the amount of adsorbed NOx reaches its saturation level, so as to form a reducing atmosphere around the catalyst, thereby to reduce the oxidized product of NOx in this reducing atmosphere.

However, an oxidized product of sulfur contained in the fuel, in addition to the oxidized product of NOx, is also deposited on the NOx catalyst. The thus deposited substances prevent deposition of NOx onto the catalyst, thereby reducing the NOx purifying or removing capability of the catalyst. Further, it is particularly difficult to reduce and remove the oxidized product of sulfur which has been deposited on the catalyst.

In view of the above problem, Japanese laid-open Patent Publication (Kokai) No. 6-88518 discloses a technique for resuming the purifying capability of the NOx catalyst, wherein the engine is controlled to operate in a rich-burn combustion region with the NOx catalyst being placed in a high-temperature environment, thereby to reduce and remove the oxidized product of sulfur.

In the technique disclosed in the above publication, however, the air-fuel ratio needs to be considerably reduced to provide a highly rich air/fuel mixture in order to reduce and remove the oxidized product of sulfur, and the fuel economy and exhaust-gas characteristics deteriorate during the regeneration process of this catalyst. Also, the output torque of the engine is undesirably changed due to changes in the air-fuel ratio upon transition from the normal operating region of the engine to the regeneration-process operating region, and upon return from the regeneration-process operating region to the normal operating region. In addition, it takes a considerably long time to reduce and remove the oxidized produce of sulfur through the regeneration process as described above. During this time, the above-described problems occur due to execution of the regeneration process.

SUMMARY OF THE INVENTION

It is therefore an object of the present invention to provide an exhaust gas purifying apparatus wherein the purifying capability of an NOx catalyst can be resumed in a relatively short time, by accelerating reduction of an oxidized product of sulfur deposited on the NOx catalyst.

To accomplish the above object, the present invention provides an exhaust gas purifying apparatus comprising: a three way catalyst provided in an exhaust pipe of an internal combustion engine; and a NOx adsorption/reduction catalyst provided in the exhaust pipe to be located downstream of the three way catalyst, wherein Ni or an oxide of Ni is added to the NOx adsorption/reduction catalyst.

In the exhaust gas purifying apparatus described above, when an oxidizing atmosphere is introduced into the exhaust pipe, a NOx adsorbent (catalyst source) which is present in the form of, for example, a metal oxide on the surface of the NOx catalyst reacts with NOx contained in exhaust gases, to thus form an oxidized product of NOx. The NOx adsorbent as described above also reacts with $SO_3$ formed from $SO_2$ that is generated by combustion of a sulfur content in the fuel, thereby to produce an oxidized product of sulfur. The thus formed oxidized products of NOx and sulfur are deposited on the NOx adsorption/reduction catalyst, and reduce its purifying capability.

When a reducing atmosphere is introduced into the exhaust pipe, $SO_2$ contained in the exhaust gases is reduced on the three way catalyst and NOx catalyst, and hydrogen sulfide is formed. The hydrogen sulfide thus formed reacts with an oxide of nickel that is present on the NOx catalyst to which Ni or an nickel oxide is added, thereby to form a nickel sulfide. Also, the reactions to reduce an oxidized product of NOx and an oxidized product of sulfur take place.

It is to be noted that hydrogen sulfide is consumed as the above reducing reaction on the NOx catalyst to form nickel sulfide proceeds. To compensate for the hydrogen sulfide consumed in this manner, the above-described reduction to form hydrogen sulfide from $SO_2$ is accelerated, and $SO_2$ is consumed. To compensate for the $SO_2$ thus consumed, the reaction that occurs on the NOx catalyst to reduce the oxidized product of sulfur is accelerated. Namely, the use of the NOx adsorption/reduction catalyst containing Ni results in an equilibrium state which causes rapid progress of the reaction in which the oxidized product of sulfur is converted into a NOx adsorbent. Consequently, the oxidized product of sulfur which induces reduction of the purifying capability of the NOx catalyst can be eliminated in a relatively short time.

The exhaust gas purifying apparatus as described above may further include temperature increasing means for increasing the temperature of the NOx adsorption/reduction catalyst. In this apparatus, the temperature of the NOx catalyst is increased during the reaction to reduce the oxidized product of sulfur, so that this reducing reaction can be accelerated.

In one preferred form of the exhaust gas purifying apparatus as described just above, the temperature increasing means may consist of exhaust gas temperature increasing means for increasing the temperature of exhaust gases discharged from the engine into the exhaust pipe. In this apparatus, the temperature of the NOx catalyst may be increased without using a heater for heating a catalyst.

In another preferred form of the exhaust gas purifying apparatus as described above, the temperature increasing means may consist of ignition timing control means for retarding the ignition timing of the internal combustion engine. In this apparatus, the temperature of the exhaust gases, and consequently that of the NOx catalyst, can be increased by retarding the ignition timing of the internal combustion engine.

The exhaust gas purifying apparatus may be installed in an in-cylinder injection type internal combustion engine in which a fuel is directly injected into each combustion chamber of the engine. In this case, the exhaust gas temperature increasing means may consist of fuel injection control means for conducting fuel injection with respect to each cylinder of the engine a plurality of times during one combustion cycle of each cylinder.

In the apparatus described just above, the fuel can be injected into each cylinder of the engine in suitable timing a plurality of times during one combustion cycle, so that the temperature of the exhaust gases, and consequently, that of the NOx catalyst, can be increased.

The exhaust gas purifying apparatus as described above may further include air-fuel ratio control mans for controlling the air-fuel ratio of the internal combustion engine so as to provide a fuel-rich air/fuel mixture. With this arrangement, the engine operates in a rich-burn combustion mode, so that a reducing atmosphere is suitably formed around the NOx catalyst, thereby to induce reactions needed to resume the purifying capability of the NOx catalyst.

BRIEF DESCRIPTION OF THE DRAWINGS

The invention will be described in greater detail with reference to a preferred embodiment thereof and the accompanying drawings, wherein.

DETAILED DESCRIPTION OF THE PREFERRED EMBODIMENTS

An in-cylinder fuel injection type internal combustion engine equipped with an exhaust gas purifying apparatus according to one embodiment of the present invention will be described in detail with reference to the drawings.

Figure 1:
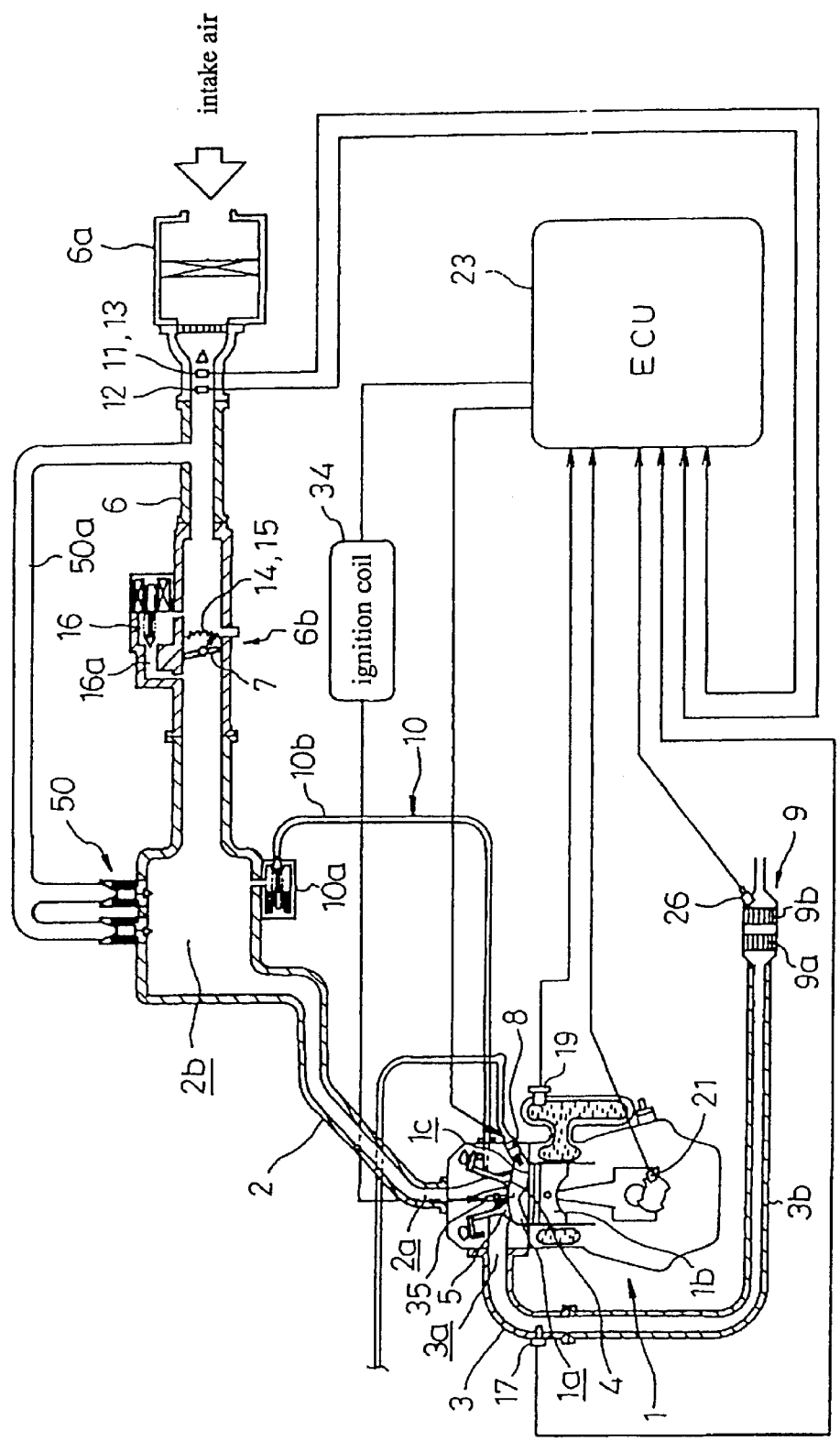
FIG. 1 is a schematic view showing the construction of a lean-burn internal combustion engine equipped with an exhaust gas purifying apparatus according to one embodiment of the present invention.

Referring first to FIG. 1, reference numeral 1 denotes a straight four-cylinder, four-cycle gasoline engine of spark ignition, in-cylinder fuel injection type. In a cylinder head of this engine 1, a spark plug 3 and a solenoid-operated type fuel injection valve 8 are mounted with respect to each cylinder, such that a fuel can be directly injected from the fuel injection valve 8 into a combustion chamber 1a. A semi-spherical cavity 1c is formed at the top face of the piston 1b provided in the cylinder. When the piston 1 is positioned at around its top dead center (TDC), a fuel spray injected from the fuel injection valve 8 reaches the inside of the cavity 1c. In the upper portion of the cylinder head, intake-side and exhaust-side camshafts for driving intake and exhaust valves 4, 5, respectively, are supported such that these camshafts are freely rotatable.

An intake port 2a for each cylinder is formed in a substantially upright direction in the cylinder head, and intake air passing through this intake port 2a is able to produce so-called reverse swirl flow in the combustion chamber 1a. An exhaust port 3a is formed in a substantially horizontal direction, and a large-diameter EGR port (not shown) diverges obliquely from this exhaust port 3a.

The engine system as shown in FIG. 1 further includes a water temperature sensor 19 for detecting the temperature of cooling water or coolant, crank-angle sensor 21 which outputs crank angle signals at certain crankshaft positions (for example, 5° BTDC and 75° BTDC) in each cylinder, and an ignition coil 34 for applying high voltage to the ignition coil 35. The camshaft is provided with a cylinder discrimination sensor (not shown) that outputs a cylinder discrimination signal, which is used for determining or identifying a cylinder that corresponds to each crank-angle signal of the crank-angle sensor.

An intake pipe 6 is connected to the intake port 2a, through an intake manifold 2 having a surge tank 20, and an air cleaner 6a, a throttle body 6b, and a step-motor type idle speed control valve (idle control valve) 16 are provided in the intake pipe 6. The intake pipe 6 is also provided with a large-diameter air bypass pipe 50a for inducting intake air into the intake manifold 2 while bypassing the throttle body 6b, and a linear-solenoid type, large-sized air bypass valve (ABV) 50 is disposed in the air bypass pipe 50a. The air bypass pipe 50a has a channel area which is commensurate with that of the intake pipe 6. When the air bypass valve 50 is placed in the fully opened state, the amount of the intake air required in an engine low- or middle-speed range can be supplied to the engine 1 through the air bypass pipe 50a. The idle control valve 16 has a smaller channel area than the air bypass valve 50, and may be used for controlling the amount of the intake air with high accuracy.

The throttle body 6b is provided with a throttle valve 7, a throttle sensor 14 for detecting the throttle opening, and an idle switch 15 for detecting the fully closed state of the throttle valve 7. Also, the air cleaner 6a incorporates intake air temperature sensor 12 and atmospheric pressure sensor 13 for obtaining the density of the intake air, and output signals representing the intake air temperature and the atmospheric pressure are generated from these sensors 12, 13, respectively. A Karman vortices air flow sensor 11 is provided in the vicinity of the inlet of the intake valve 6, for generating a vortex generation signal which is proportional to a volume air flow rate of the intake air inducted during one intake stroke.

The EGR port as indicated above is connected to a location downstream of the throttle valve 7 and upstream of the intake manifold 2. An EGR pipe 10b is provided with a step-motor type EGR valve 10a, and this EGR valve 10 and EGR pipe 10b constitute an EGR device 10.

In FIG. 1, reference numeral 17 denotes an $O_2$ sensor attached to the exhaust manifold 3 for detecting an oxygen concentration of exhaust gases, and reference numeral 9 denotes a catalytic converter (exhaust gas purifying device) provided in the exhaust pipe 3b for purifying exhaust gases.

The catalytic converter 9 includes a three way catalyst 9a disposed in the exhaust pipe 3b, and a lean-burn NOx catalyst 9b disposed in the exhaust pipe 3b downstream of the three way catalyst 9a. Three harmful components, namely, CO, HC, NOx, contained in the exhaust gases discharged from the combustion chamber 1a of the engine 1 into the exhaust pipe 3b are sufficiently removed by the three way catalyst 9a while the engine 1 is operating with an air/fuel mixture whose air-fuel ratio is close to the stoichiometric ratio. The lean-burn NOx catalyst 9b has a function of removing NOx in the exhaust gases which cannot be sufficiently removed by the three way catalyst 9a while the engine 1 is operating in a lean-burn combustion mode. Accordingly, the catalytic converter 9 including both the NOx catalyst 9b and the three way catalyst 9a is suitably used in the in-cylinder fuel injection type engine 1 or other lean-burn combustion type engine, which is often operated with a fuel-lean mixture in an attempt to improve the fuel economy. In addition, the three way catalyst 9a, which is located in an upstream portion of the exhaust pipe 3b, can be activated in an early period of engine operation, and therefore the engine 1 shows a high capability to purify the exhaust gases immediately after it is started.

The lean-burn NOx catalyst 9b consists of a NOx adsorption/reduction catalyst. This NOx adsorption/reduction catalyst 9b includes a support layer formed of, for example, $Al_2O_3$ (alumina), and various catalyst sources loaded on this support layer. The NOx catalyst 9b of the present embodiment uses catalyst sources selected from alkali metals, alkali earth metals, and alkali rare earth metals, such as Pt (platinum), Rh (rhodium), Ba (barium), K (potassium), La (lanthanum), and Ce (cerium). This NOx catalyst 9b is characterized by further containing Ni (nickel). In the present embodiment, Ni fine particles are dispersed and loaded on the surface of the alumina support layer or in the surface portion of this layer. To load the fine nickel particles on the alumina support layer, Ni is added to the other catalyst sources and liquified, and the support is immersed in the resulting catalytic solution, so that a catalyst layer is formed on the surface of the support. The catalyst sources as listed above may be in the form of metal oxides. For example, Ba may take the form of $BaCO_3$, which functions as a NOx adsorbing agent.

An exhaust emission purification system of the catalytic converter 9 as described above will be explained below.

When the engine 1 operates in a lean-burn combustion mode (which corresponds to a compression stroke injection lean-burn mode or an intake stroke injection lean-burn mode), and an oxidizing atmosphere exists in the exhaust pipe 3b, the following reactions (1)–(4) are supposed to occur on the three way catalyst 9a.

$$SO_2 + 1/2 O_2 \rightarrow SO_3 \tag{1}$$

$$3SO_3 + 2CeO_2 \rightarrow Ce_2(SO_4)_3 + 1/2 O_2 \tag{2}$$

$$2HC + 5/2 O_2 \rightarrow H_2O + 2CO_2 \tag{3}$$

$$CO + 1/2 O_2 \rightarrow CO_2 \tag{4}$$

On the other hand, the following reactions (5)–(7) are supposed to occur on the NOx catalyst 9b.

$$SO_3 + BaCO_3 \rightarrow BaSO_4 + CO_2 \tag{5}$$

$$NO + BaCO_3 + 3/2 O_2 \rightarrow Ba(NO_3)_2 + CO_2 \tag{6}$$

$$NiS + 3/2 O_2 \rightarrow NiO + SO_2 \tag{7}$$

As indicated in the above reaction formulae, most of sulfur-containing components contained in the fuel are burned in the combustion chamber, and discharged in the form of $SO_2$ into the exhaust pipe 3b, and the $SO_2$ react with oxygen in the exhaust gases on the three-way catalyst 9a, to provide $SO_3$. The thus formed $SO_3$ reacts with $CeO_2$ on the three way catalyst 9a, to produce $Ce_2(SO_4)_3$. Namely, $SO_3$ is trapped by the catalyst 9a in the form of $Ce_2(SO_4)_3$. A remaining portion of $SO_3$ that was not trapped by the three way catalyst 9a flows toward the NOx catalyst 9b, and reacts with $BaCO_3$ as an NOx adsorbent on the Nox catalyst 9b, to thus form $BaSO_4$ as one type of sulfate $X—SO_4$ that is an oxidized product of sulfur. This $BaSO_4$ is deposited on the surface of the NOx catalyst 9b, and reduces the purifying capability of the NOx catalyst 9b.

Also, NO contained in the exhaust gases reacts with $BaCO_3$, to produce $Ba(NO_3)_2$ as one type of nitrate X—NOx that is an oxidized product of NOx. As a result, NOx contained in the exhaust gases is adsorbed by the NOx adsorbent. In the presence of $SO_3$, however, the above-indicated reaction (5) for forming $BaSO_4$ is more likely to occur than the reaction (6) for adsorbing NOx, and therefore the purifying capability of the NOx catalyst deteriorates.

In the meantime, NiS in the formula (7) is produced through a reaction (which will be described later) for reducing NiO on the NOx catalyst 9b in a reducing atmosphere. This NiS reacts with excessive oxygen in the exhaust gases to produce NiO, which remains on the surface of the NOx catalyst. $CO_2$ or $SO_2$ that appear as a result of the above reactions are discharged or released into the atmosphere.

When the engine 1 operates with a fuel-rich mixture in a rich-burn combustion mode (that corresponds to an open loop mode and a refresh operation), and a reducing atmosphere exists in the exhaust pipe 3b, the following reactions (11)–(13) are supposed to occur on the three way catalyst 9a.

$$SO_2 + 3H_2 \rightarrow H_2S + 2H_2O \tag{11}$$

$$Ce_2(SO_4)_3 + 11H_2 \rightarrow 3H_2S + 2CeO_2 + 8H_2O \tag{12}$$

$$NO + CO \rightarrow 1/2 N_2 + C_2 \tag{13}$$

On the other hand, the following reactions (14)–(18) are supposed to occur on the NOx catalyst 9b.

$$BaSO_4 + CO \rightarrow BaCO_3 + SO_2 \tag{14}$$

$$SO_2 + 3H_2 \rightarrow H_2S + 2H_2O \tag{15}$$

$$NiO + H_2S \rightarrow NiS + H_2O \tag{16}$$

$$Ba(NO_3)_2 + CO \rightarrow BaCO_3 + 2NO + O_2 \tag{17}$$

$$NO + CO \rightarrow 1/2 N_2 + CO_2 \tag{18}$$

In the reducing atmosphere, $SO_2$ contained in the exhaust gases is reduced by the three way catalyst and NOx catalyst, and $H_2S$ is formed. This $H_2S$ reacts with NiO on the NOx catalyst to form NiS, which remains on the surface of the NOx catalyst. Therefore, $H_2S$ having an odor is prevented from being released into the atmosphere.

As indicated in the formula (14), $BaSO_4$ as a sulfate containing sulfur reacts with CO contained in the exhaust gases, and is reduced into $BaCO_3$ as a NOx adsorbent. As a result of this reduction, $SO_2$ is generated.

In general, the reduction as indicated in the reaction formula (14) is less likely to proceed when the NOx catalyst is placed at a high temperature. Namely, it is difficult to reduce and remove $BaSO_4$ deposited on the surface of the NOx catalyst in a short time. In the conventional NOx adsorption/reduction catalyst, the presence of $H_2S$ prevents conversion of the oxidized product of sulfur into the NOx adsorbent as indicated in the formula (14).

Figure 6:
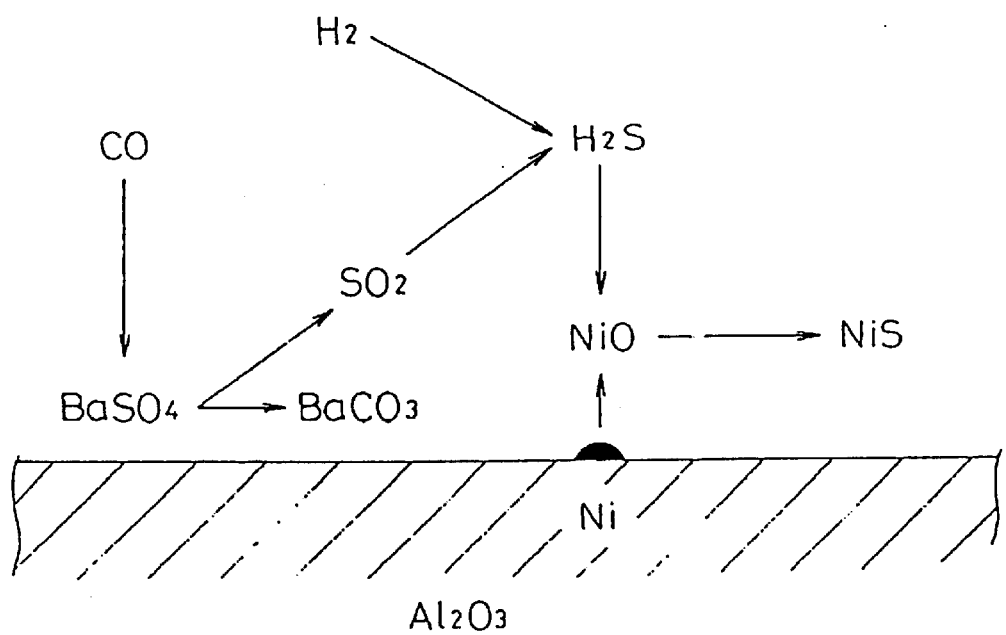
FIG. 6 is a view schematically showing a part of reactions that occur in a reducing atmosphere on an NOx adsorption/reduction catalyst containing Ni.

In the present embodiment, Ni is added as a catalyst source to the NOx catalyst 9b, so as to accelerate the reduction of the reaction formula (14), thereby to remove $BaSO_4$ in a relatively short time (refer to FIG. 6).

More specifically, as the reduction of NiO into NiS as indicated in the formula (16) proceeds on the NOx catalyst, $H_2S$ is consumed. Thus, Ni that is added to the NOx catalyst 9b takes the form of NiO, and functions to remove $H_2S$ that prevents conversion of the oxidized product of sulfur into the NOx adsorbent. In other words, NiO functions as a sulfur absorbent for absorbing a sulfur content that appears in the form of $H_2S$.

To compensate for $H_2S$ consumed as a result of conversion of NiO into NiS, the reduction of $SO_2$ into $H_2S$ as indicated in the formula (15) is accelerated on the NOx catalyst. To compensate for the $SO_2$ thus consumed, the reduction of $BaSO_4$ into $BaCO_3$ as indicated in the formula (14) is accelerated on the NOx catalyst. As a result, $BaSO_4$ that induces reduction of the purifying capability of the NOx catalyst can be removed in a relatively short time, and thus the NOx catalyst resumes its purifying capability to a satisfactory level.

As described later, in the present embodiment, the engine operates in a rich-burn mode at a relatively small air-fuel ratio in a condition where the temperature of exhaust gases, or that of NOx catalyst, has been increased by retarding or delaying the ignition timing of the engine 1, so as to accelerate the reduction of the formula (14) for removing $BaSO_4$.

In the exhaust gas purifying apparatus that uses the combination of the three way catalyst and the NOx adsorption/reduction catalyst located downstream of the three way catalyst, it is inconvenient or undesirable to add Ni to the three way catalyst because the NOx catalyst is poisoned by sulfur. Namely, if NiS is produced on the three way catalyst to which Ni is added, as a result of the reaction as indicated above in the formula (16), NiS is oxidized in the oxidizing atmosphere, thereby to produce NiO and $SO_2$ as indicated in the formula (7), and $SO_2$ is oxidized into $SO_3$. If the $SO_3$ reaches the NOx catalyst, the NOx adsorbent as indicated in the formula (5) is poisoned by the $SO_3$.

Next, the engine 1 and its surrounding components will be further explained.

Although not illustrated in the figures, the fuel reserved in a fuel tank that is installed in the rear portion of the vehicle body is sucked up by a motor-driven, low-pressure fuel pump, and delivered toward the engine 1 through a low-pressure feed pipe. The fuel is then supplied into each fuel injection valve 8 by a high-pressure fuel pump, through a high-pressure feed pipe and a delivery pipe.

An electronic control unit (ECU) 23, which is installed in the vehicle compartment, includes input and output devices (not shown), memory devices (such as ROM, RAM, and non-volatile RAM) for storing control programs, control maps, and the like, a central processing unit (CPU), a time counter, and so on, and is adapted to control the whole system of the engine 1.

To the input of the ECU 23 is connected an air conditioner that provides a load of the engine during its operation, a power steering system, and switches for detecting the operating conditions of an automatic transmission system and other equipment.

The ECU 23 determines a fuel injection mode as descried later, fuel injection amount (air-fuel ratio), fuel injection finish time, ignition timing, the amount of EGR gas to be introduced, and so on, based on input signals from various sensors and switches as described above.

In the present embodiment, in order to accelerate reduction and removal of a sulfate ($BaSO_4$) that causes reduction of the purifying capability of the NOx catalyst 9b, thereby to resume the purifying capability in a short time, the engine 1 operates in a rich-burn mode at a relatively small airfuel ratio while the temperature of exhaust gases, or that of NOx catalyst, is increased by retarding the ignition timing of the engine 1. In other words, the exhaust gas purifying apparatus of the present embodiment includes an ignition timing control means for retarding the ignition timing, and an air-fuel ratio control means for controlling the air-fuel ratio to provide a fuel-rich air/fuel mixture. The ECU 23 fulfills the ignition timing retarding function and air-fuel ratio control function of these means in the manner as described later.

The operation of the engine 1 constructed as described above is normally controlled by the ECU 23 in the following manner.

When the engine is started in a cool state, or is being in an idling operation, a suction stroke injection mode is selected, and the fuel is injected into each cylinder of the engine so as to provide a fuel-rich air/fuel mixture, or a relatively small air-fuel ratio. In this mode, the air bypass valve (ABV) 50 is closed, and the intake air is supplied to the combustion chamber 1a through a clearance of the throttle valve 7 or from the idle control valve 16. Also, in order to control the idle speed, the idle control valve 16 (and the air bypass valve 50 as needed) is controlled in accordance with an increase or decrease of the engine load due to accessories, such as an air conditioner. If the $O_2$ sensor 17 detects the activation temperature (i.e., temperature at which the catalytic converter 9 is activated), air-fuel ratio feedback control based on the output voltage of the $O_2$ sensor 17 is started, and the three way catalyst 9a of the catalytic converter 9 purifies exhaust gases so as to remove harmful components contained in the exhaust gases.

When the idling operation of the engine 1 is finished, the current fuel injection control region (engine operating region) is searched from a map (not illustrated), based on the target average effective pressure derived from the throttle opening θth, and the engine speed, the fuel injection mode and fuel injection amount which match the searched control region are determined and used for driving the fuel injection valve 8. At the same time, the opening or closing of the air bypass valve 50 and EGR valve 45 is also controlled.

More specifically, while the engine is operating with a low load, at a low speed, for example, during an idling operation, it is determined that the operating region of the engine is in a compression stroke injection lean-burn region, and a compression stroke fuel injection mode is selected. In this mode, the air bypass valve 50 and EGR valve 10a are opened depending upon the operating conditions of the engine, and the fuel injection is controlled so as to provide a fuel-rich air/fuel mixture having an air-fuel ratio of about 20 to 40.

In this case, a fuel spray injected from the fuel injection valve 8 is maintained in the cavity 1c of the piston 1b due to reverse swirl formed in the combustion chamber 1a by the intake air flowing from the intake port 2a, so that an air/fuel mixture around the stoichiometric air/fuel ratio is formed around the ignition plug 35 at the point of time of ignition. As a result, even the fuel-lean mixture, which as a whole has a considerably large air-fuel ratio, can be fired or ignited, while assuring reduced discharge of CO and HC, and significantly improved fuel economy. The discharged amount of NOx is also reduced due to re-circulation of the exhaust gases.

While a middle load is being applied to the engine, the engine operates in an intake stroke lean-burn region or stoichiometric ratio feed-back control region (S-F/B region), and therefore an intake stroke fuel injection mode is selected. In the intake stroke lean-burn region, the opening of the air bypass valve 50 and the fuel injection amount are controlled so as to provide a fuel-lean air-rich mixture having a relatively large air/fuel ratio (of about 20 to 23). When the engine is in the S-F/B region, the open/closed states of the air bypass valve 50 and EGR valve 10a are controlled, and air-fuel ratio feedback control is performed in accordance with the output voltage of the $O_2$ sensor 17.

When the engine is being rapidly accelerated or operating at a high speed, an open loop region is determined as the operating region of the engine 1, and the intake stroke injection mode is selected. At the same time, the air bypass valve 50 is closed, and the fuel injection is controlled so as to provide a fuel-rich mixture having a relatively small air-fuel ratio.

While the engine is in a coasting or steady-state operation with the vehicle running at a middle or high speed, a fuel cut region is determined as the engine operating region, and the fuel injection is completely stopped.

Figure 2:
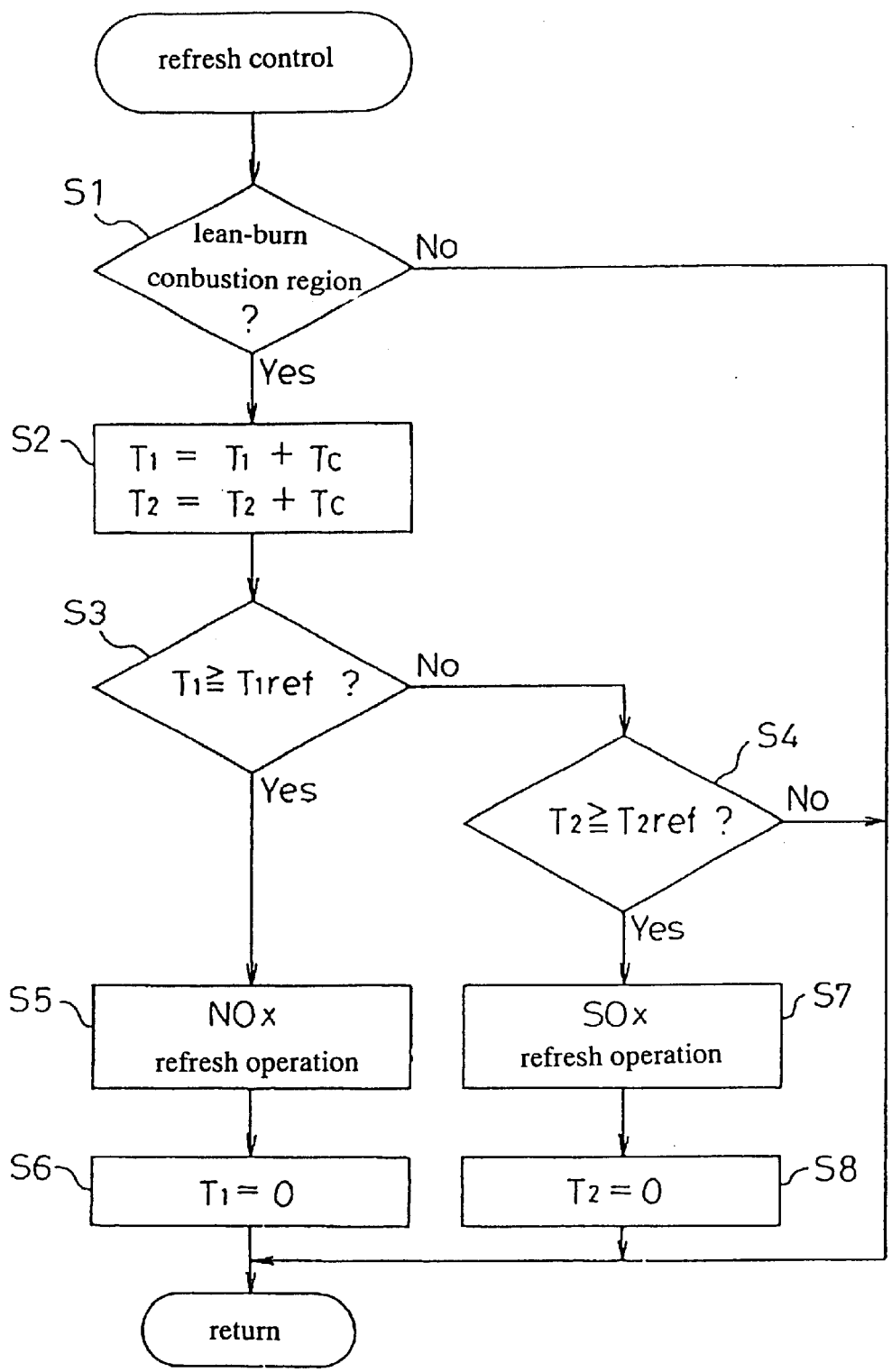
FIG. 2 is a flowchart of a refresh control routine that is executed by an electronic control unit (ECU) of the engine of FIG. 1.
Figure 3:
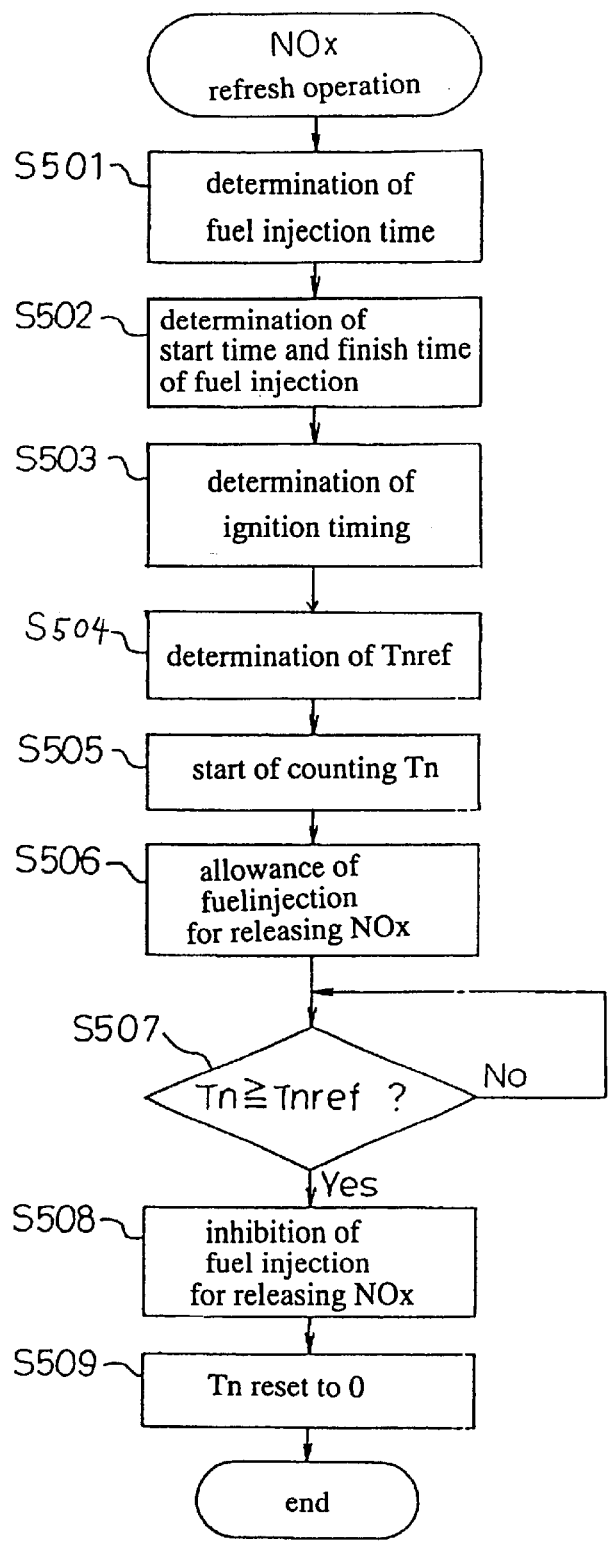
FIG. 3 is a flowchart of a NOx refresh operation subroutine that is executed in the refresh control routine of FIG. 2.
Figure 4:
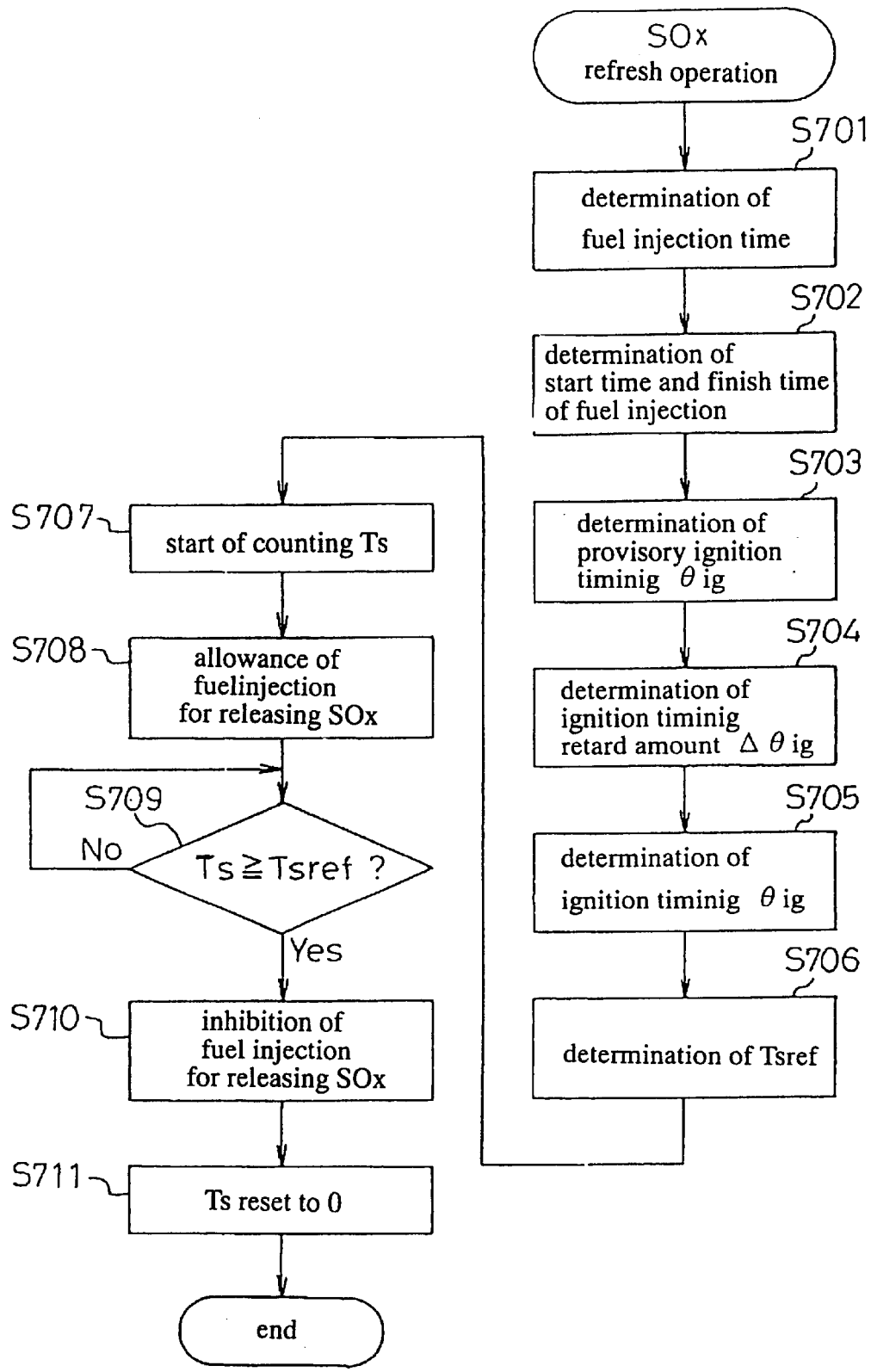
FIG. 4 is a flowchart of a SOx refresh operation subroutine that is executed in the refresh control routine of FIG. 2.

Referring to FIG. 2 through FIG. 4, refresh control executed by the ECU 23 will be described.

This refresh control is performed in an attempt to reduce and remove nitrate $X-NO_3$ and sulfate $X-SO_4$ ($Ba(NO_3)_2$ and $BaSO_4$ in this embodiment) which are oxidized products of NOx and SOx contained in the exhaust gases, so as to resume the purifying capability of the NOx catalyst 9b. As described later, in this refresh control, a NOx refresh operation and a SOx refresh operation are performed as needed.

When the time of execution of the refresh control comes in a fuel injection control routine (not shown), while the fuel injection control based on the engine operating region is being performed as described above, a refresh control routine as illustrated in FIG. 2 starts being executed. Initially, step S1 is executed to determine whether the engine 1 is operating in a lean-burn combustion region (compression stroke injection lean-burn region or intake stroke injection lean-burn region). If a negative decision (No) is obtained in this step, namely, if the engine is not operating with a fuel-lean mixture, this refresh control routine is once terminated, and then executed again, starting with step S1, upon a lapse of a control routine execution period Tc.

While the engine is operating in the lean-burn mode, an oxidizing atmosphere is present in the exhaust pipe 3, and the above-indicated reactions (1)–(4) and reactions (5)–(7) occur on the three way catalyst 9a and NOx catalyst 9b. As a result, $BaSO_4$ and $Ba(NO_3)_2$ are slowly deposited on the NOx catalyst 9b, thus slowly reducing the purifying capability of this catalyst.

If the above-described step S1 determines that the engine is operating in the lean-burn mode, the control flow goes to step S2 in which the control routine execution period Tc is added to the first count time T1 which represents the total implementation time of the lean-burn operation of the engine after the point of time when the last NOx refresh operation was finished, and the control routine execution period Tc is added to the second count time T2 which represents the total implementation time of the lean-burn operation of the engine after the point of time when the last SOx refresh operation was finished. For example, the count value of each of timer counters (not shown) for counting T1 and T2, respectively, is incremented by value 1 that corresponds to the period Tc. In this connection, the initial value of the time T1, T2 is zero.

Step S3 is then executed to read a first predetermined time T1ref from a memory device of the ECU 23, and determine whether the first count time T1 has reached the first predetermined time T1ref. If a negative decision (No) is obtained in step S3, step S4 is executed to read a second predetermined time T2ref from the memory device, and determine whether the second count time T2 has reached the second predetermined time T2ref. If a negative decision (No) is obtained in step S4, the present routine is once terminated.

The first and second predetermined times T1ref, T2ref are set to respective lengths of time in which the amounts of $Ba(NO_3)_2$ and $BaSO_4$ deposited on the NOx catalyst 9b do not exceed respective allowed values even where the lean-burn operation is continuously or intermittently performed by the engine over these lengths of time, regardless of the engine operating conditions during the lean-burn operation.

Figure 5:
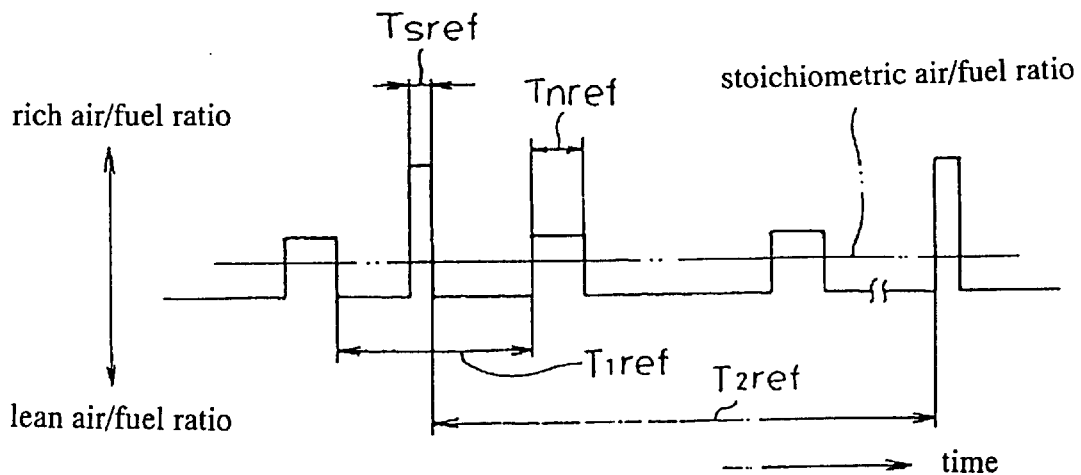
FIG. 5 is a view showing the implementation time and period of each of the NOx refresh operation and SOx refresh operation.

As shown in FIG. 5, the second predetermined time T2ref is set to be longer than the first predetermined time T1ref This is because the content of SOx in the exhaust gases is smaller than the content of NOx, and the speed of deposition of $BaSO_4$ onto the NOx catalyst during the lean-burn operation of the engine is slower than that of deposition of $Ba(NO_3)_2$.

If an affirmative decision (Yes) is obtained in the above step S3, namely, if it is determined that the first predetermined time T1ref has elapsed after the point of time at which the last NOx refresh operation is finished, there is a possibility that the deposited amount of $Ba(NO_3)_2$ exceeds the allowed value, and therefore step S5 is executed to perform a NOx refresh operation so as to reduce and remove $Ba(NO_3)_2$. In this NOx refresh operation, the engine 1 is operated over the time required for releasing NOx, at an air-fuel ratio suitable for releasing $Ba(NO3)_2$, and consequently releasing NOx.

More specifically, in a subroutine of NOx refresh operation as shown in FIG. 3, the fuel injection time is determined in step S501, with reference to a map that is not illustrated, so as to achieve an air-fuel ratio that is suitable for releasing NOx. For example, this air-fuel ratio is approximately equal to 14, which is smaller than but close to the stoichiometric ratio. In the next step S502, the start time and finish time of fuel injection are determined in order to implement fuel injection over the NOx-releasing fuel injection time determined in step S501. Step S503 is then executed to determine the ignition timing based on a map that is not illustrated. In the next step S504, a NOx refresh operation time tnref that represents an engine operating time required for releasing NOx is read from the memory device, and step S505 is then executed to start a timer counter (not shown) that counts an implementation time tn of the NOx refresh operation.

In the subsequent step S506, fuel injection control for releasing NOx is allowed to be performed. As a result, the fuel injection control according to the engine operating region is switched to fuel injection control for releasing NOx. Accordingly, the fuel injection valve 8 corresponding to each cylinder of the engine 1 is opened when the fuel injection start time determined in step S502 is reached, and is closed when the fuel injection finish time is reached. When reaching the ignition timing determined in step S503, the ignition plug 35 is actuated.

In step S507, it is determined whether the count time tn of the timer counter as described above has reached the NOx refresh operation time tnref or not. If a negative decision (No) is obtained, step S507 is executed again. Thus, as long as a negative decision is obtained in step S507, the fuel injection is started each time the fuel injection start time is reached, and the fuel spray is ignited each time the ignition timing is reached. Consequently, the engine 1 operates with a slightly fuel-rich mixture at an air-fuel ratio in the vicinity of the stoichiometric ratio, which is suitable for releasing NOx, whereby $Ba(NO_3)_2$ deposited on the NOx catalyst 9b is slowly converted into $BaCO_3$, as indicated above in the reaction formula (17). Namely, an NOx releasing reaction proceeds. Since the NOx catalyst is placed in a reducing atmosphere in this operation, an SOx releasing reaction also proceeds according to the above formula (14).

If an affirmative decision (Yes) is obtained in step S507 after the NOx refresh operation is performed over the time tnref, it is determined that NOx has been sufficiently released or eliminated, and the fuel injection for releasing NOx is inhibited in step S508. Then, the fuel injection control based on the engine operating region is resumed. Step S509 is then executed to reset the timer for counting the implementation time of the NOx refresh operation.

If the NOx refresh operation is finished in the manner as described above, the control flow proceeds to step S6 of the refresh control routine of FIG. 2, and the first count time T1 that represents the total implementation time of the lean-burn operation after the finishing time point of the NOx refresh operation is reset to 0.

Where the vehicle is required to be accelerated during the NOx refresh operation, for example, the NOx refresh operation may be interrupted, and the fuel injection control that meets the request for acceleration may be performed. This also applies to the SOx refresh operation.

In the refresh control routine of FIG. 2, if an affirmative decision (Yes) is obtained in step S4, namely, if it is determined that the second predetermined time T2ref has elapsed after the point of time when the last SOx refresh operation is finished, there is a possibility that the amount of $BaSO_4$ deposited on the NOx catalyst exceeds the allowed value, and therefore step S7 is executed to perform a SOx refresh operation for reducing and removing $BaSO_4$ so as to release SOx. In this SOx refresh operation, the engine operates at an air-fuel ratio suitable for releasing or removing $BaSO_4$, and consequently SOx, from the NOx catalyst 9b, over a period of time required for releasing the SOx. Also, the temperature of the NOx catalyst is increased in order to accelerate the reaction for converting $BaSO_4$ into $BaCO_3$. In the present embodiment, the temperature of exhaust gases is increased by retarding the ignition timing of the engine.

More specifically, in a subroutine of SOx refresh operation as illustrated in FIG. 4, step S701 is initially executed to determine, with reference to a map (not shown), the fuel injection time or period required to achieve a desired air-fuel ratio (for example, 11) that is small enough to release SOx. Step S702 is then executed to determine the fuel injection start time and fuel injection finish time so that the fuel is injected into each cylinder of the engine over the fuel injection time determined in step S701. Then, step S703 is executed to provisionally determine the ignition timing $\theta ig$ with reference to a map that is not illustrated, and step S704 is executed to determine an ignition timing retard amount $\Delta\theta ig$ used for increasing the temperature of exhaust gases. In the next step S705, the retard amount $\Delta\theta ig$ is added to the ignition timing $\theta ig$ that is temporarily determined in step S703, so as to finally determine the ignition timing $\theta ig$.

Subsequently, step S706 is executed to read, from the memory device, the SOx refresh operation time tsref that represents the engine operating time required for releasing SOx, and step S707 is then executed to start a time counter (not shown) for counting the implementation time ts of the SOx refresh operation.

In the next step S708, the fuel injection control for releasing SOx is allowed to be performed. As a result, the fuel injection control based on the engine operating region is switched or changed to the fuel injection control for releasing SOx.

In step S709, it is determined whether the count time ts of the timer counter has reached the SOx refresh operation time tsref or not. If a negative decision (No) is obtained, step S709 is executed again. Thus, as long as a negative decision is obtained in step S709, the fuel injection is started each time the fuel injection start time is reached, and is finished when the fuel injection finish time is reached. Also, the fuel spray is ignited each time the ignition timing is reached. Consequently, the engine 1 operates with a fuel-rich air/fuel mixture, with its air-fuel ratio suitably controlled for releasing SOx, whereby $BaSO_4$ deposited on the NOx catalyst 9b is slowly converted into $BaCO_3$, as indicated above in the formula (14). Namely, a SOx releasing reaction proceeds. During the SOx refresh operation, the exhaust gas temperature is increased since the ignition timing is retarded or delayed. As a result, the temperature of the NOx catalyst is increased, and the reaction of the formula (14) for converting $BaSO_4$ into $BaCO_3$ is accelerated. In addition, the reaction of the formula (16) for consuming $H_2S$ occurs due to the use of the NOx catalyst 9b containing Ni, and thus the reaction of the formula (14) is further accelerated. Since the NOx catalyst is placed in a reducing atmosphere during the SOx refresh operation, the reaction to release NOx also proceeds.

If the SOx refresh operation is performed over the time tsref, and an affirmative decision (Yes) is obtained in step S709, it is judged that SOx has been sufficiently released or eliminated, and the fuel injection for releasing SOx is inhibited in step S710. Then, the fuel injection control based on the engine operating region is resumed. Step S711 is then executed to reset the timer counter for counting the implementation time ts of the SOx refresh operation.

If the SOx refresh operation is finished in the manner as described above, the control flow proceeds to step S7 of the refresh control routine of FIG. 2, and the second count time T2 that represents the total implementation time of the engine lean-burn operation after the finishing time point of the SOx refresh operation is reset to 0.

As described above, in the illustrated embodiment, the NOx catalyst containing Ni is placed in the reducing atmosphere, so that the oxidized product of sulfur can be rapidly reduced and removed, and the temperature of the NOx catalyst is increased during this reduction and removal, so that the reducing reaction is accelerated. Furthermore, different air-fuel ratios for providing fuel-rich mixtures and different periods are employed in the NOx refresh operation and the SOx refresh operation, so as to reduce the amount of the fuel used for these refresh operations to be as small as possible.

It is to be understood that the present invention is not limited to the illustrated embodiment, but may be otherwise embodied with various changes or modifications.

While the present invention is applied to the in-cylinder injection type four-cylinder engine in the illustrated embodiment, this invention is also applicable to engines other than those having four cylinders, and to lean-burn combustion engines other than in-cylinder or direct injection type engines.

In the illustrated embodiment, the temperature of the NOx catalyst is increased by retarding the ignition timing and thereby increasing the temperature of exhaust gases. It is, however, possible to use a heater for heating a catalyst, a secondary air supply system, or the like, as means for increasing the temperature of the NOx catalyst. In the in-cylinder injection type engine, the fuel may be injected a plurality of times during one combustion cycle of each cylinder of the engine, instead of retarding the ignition timing, so as to increase the temperature of the exhaust gases, and consequently increase the temperature of the NOx catalyst. In this case, the ECU 23 also serves as fuel injection control means for conducting the fuel injection a plurality of times.

To accomplish the fuel injection a plurality of times, the first fuel injection may be normally conducted, and the second, additional fuel injection may be conducted in the initial to middle period of an expansion stroke of main combustion due to ignition followed by the first fuel injection, as disclosed in Japanese laid-open Patent Publication No. 8-100638, for example. In this case, the fuel injected in the second, additional fuel injection is fired through flame propagation of the main combustion, whereby the temperature of exhaust gases is increased.

Although the fuel injection control based on the engine operating conditions is resumed immediately after the SOx refresh operation is finished in the illustrated embodiment, the NOx purifying capability of the NOx catalyst may be reduced since the temperature of the NOx catalyst is relatively high when the SOx refresh operation has been just finished. To compensate for the reduction of the purifying capability, the engine may be controlled to operate at the stoichiometric ratio immediately after the SOx refresh operation is finished. In this case, the three way catalyst 8a exhibits the maximum purifying power or capability, thereby to compensate for the reduction of the purifying power of the NOx catalyst immediately after completion of the SOx refresh operation.

While the first and second predetermined times T1ref, T2ref as fixed lengths of time are used to provide conditions for starting the NOx and SOx refresh operations in the illustrated embodiment, the times T1ref and T2ref may be variably determined, for example, with reference to a map. For instance, the implementation times T1ref and T2ref of the refresh operations can be effectively set to variable values depending upon the length of time of use of the catalyst, since the NOx catalyst 9b deteriorates with an increase in the time of its use. Alternatively, the refresh operations may be started depending upon various conditions, such as the traveling distance of the vehicle, traveling time of the vehicle, and an integrated value of the amount of fuel consumption. These alternative methods may be applied to the implementation times of the NOx and SOx refresh operations tnref and tsref.

While Ni is added to the catalyst in the illustrated embodiment, an oxide of Ni may be added. When the catalyst reaches its activation temperature under a lean atmosphere, Ni reacts with $O_2$ so that NiO is present on the catalyst. For this reason, an oxide of Ni may be added in advance.

What is claimed is:

1. An exhaust gas purifying apparatus comprising:

a three way catalyst provided in an exhaust pipe of an internal combustion engine;

a NOx adsorption/reduction catalyst provided in the exhaust pipe to be located downstream of said three way catalyst, said NOx absorption/reduction catalyst absorbing NOx and SOx in exhaust gas in an oxidizing atmosphere and reducing NOx and SOx in exhaust gas in a reducing atmosphere; and SOx refresh operation means for raising a temperature of the NOx absorption/reduction catalyst and controlling an atmosphere in the exhaust pipe to a reducing atmosphere so that absorbed SOx is released from said NOx absorption/reduction catalyst, wherein at least one of Ni and an oxide of Ni is added to said NOx absorption/reduction catalyst to accelerate the reduction process of absorbed SOx performed in the NOx absorption/reduction catalyst, and wherein the Ni or oxide of Ni of said NOx absorption/reduction catalyst reacts with $H_2S$ in the exhaust gas to form NiS.

2. An exhaust gas purifying apparatus as defined in claim 1, wherein said SOx refresh operation means comprises exhaust gas temperature increasing means for increasing a temperature of exhaust gases discharged from the internal combustion engine into the exhaust pipe.

3. An exhaust gas purifying apparatus as defined in claim 2, wherein said exhaust gas temperature increasing means comprises ignition timing control means for retarding an ignition timing of the internal combustion engine.

4. An exhaust gas purifying apparatus as defined in claim 2, wherein the internal combustion engine is an in-cylinder injection type internal combustion engine in which a fuel is directly injected into each combustion chamber of the engine, and wherein said exhaust gas temperature increasing means comprises fuel injection control means for conducting fuel injection with respect to each cylinder of the engine a plurality of times during one combustion cycle of said each cylinder.

5. An exhaust gas purifying apparatus as defined in claim 1, further comprising air-fuel ratio control means for controlling an air-fuel ratio of the internal combustion engine so as to provide a fuel-rich air/fuel mixture.

6. An exhaust gas purifying apparatus comprising:

a three way catalyst provided in an exhaust pipe of an internal combustion engine;

a NOx adsorption/reduction catalyst provided in the exhaust pipe to be located downstream of the three way catalyst, the NOx absorption/reduction catalyst absorbs NOx and SOx in exhaust gas in an oxidizing atmosphere and reduces NOx and SOx in exhaust gas in a reducing atmosphere;

an air/fuel ratio control means for controlling the air-fuel ratio to provide a fuel-rich air fuel mixture and a slightly fuel-rich air/fuel mixture;

a NOx refresh operation counter which measures a first period T1 which represents the total period after a last NOx refresh operation was finished;

a NOx refresh operation means which performs a NOx refresh operation to release absorbed NOx from the NOx absorption/reduction catalyst whenever T1 is greater than or equal to a first predetermined period T1ref by raising a temperature of the NOx absorption/reduction catalyst and producing a slightly fuel rich air/fuel mixture to control an atmosphere in the exhaust pipe to a reducing atmosphere;

a SOx refresh operation counter which measures a second period T2 which represents a total period after a last SOx refresh operation was finished; and a SOx refresh operation means which performs an SOx refresh operation to release absorbed SOx from the NOx absorption/reduction catalyst whenever T2 is greater than or equal to a second predetermined period T2ref by raising a temperature of the NOx absorption/reduction catalyst and producing a fuel rich air/fuel mixture to control an atmosphere in the exhaust pipe to a reducing atmosphere;

wherein the T2ref is greater than T1ref; and wherein at least one of Ni and an oxide of Ni is added to the NOx adsorption/reduction catalyst to accelerate the reduction process of absorbed SOx performed in the NOx absorption/reduction catalyst.

7. An exhaust gas purifying apparatus as defined in claim 6, wherein T1 represents a total implementation time of fuel lean air/fuel mixture after a time when a last NOx refresh operation was finished; and wherein T2 represents a total implementation time of fuel lean air/fuel mixture after a time when a last SOx refresh operation was finished.

8. An exhaust gas purifying apparatus as defined in claim 6, wherein T1ref and T2ref are variables which are determined with reference to a map.

9. An exhaust gas purifying apparatus as defined in claim 6, wherein the T1ref and T2ref are variables which decrease as the total operating life of the NOx adsorption/reduction catalyst increases.

10. An exhaust gas purifying apparatus as defined in claim 6, wherein the T1ref and T2ref are variables which are determined with reference to at least one of a cumulative mileage of the vehicle, a cumulative operating time of the vehicle, and an integrated value of the amount of fuel consumption.

* * * * *